United States Patent [19]

Schira et al.

[11] 4,357,662

[45] Nov. 2, 1982

[54] CLOSED LOOP TIMING AND FUEL DISTRIBUTION CONTROLS

[75] Inventors: John J. Schira, Westland; Chun-Keung Leung, Farmington, both of Mich.

[73] Assignee: The Bendix Corporation, Southfield, Mich.

[21] Appl. No.: 187,400

[22] Filed: Sep. 15, 1980

Related U.S. Application Data

[63] Continuation of Ser. No. 904,131, May 8, 1978, abandoned.

[51] Int. Cl.³ .......................... F02B 3/02; F02D 5/00; F02M 51/00; F02P 5/14
[52] U.S. Cl. .............................. 364/431.08; 123/415; 123/419; 123/436; 364/508; 364/726
[58] Field of Search ...................... 364/431.04, 431.05, 364/431.06, 431.07, 431.08, 424; 73/116, 462; 123/415, 416, 419, 425, 426, 435, 436, 480, 486, 488, 492, 493; 324/392

[56] References Cited

U.S. PATENT DOCUMENTS

| | | | |
|---|---|---|---|
| 3,749,070 | 7/1973 | Oishi et al. | 123/415 |
| 3,875,394 | 4/1975 | Shapely | 364/604 |
| 3,883,795 | 5/1975 | Klein et al. | 324/392 |
| 3,897,766 | 8/1975 | Pratt, Jr. et al. | 123/426 |
| 3,935,846 | 2/1976 | Zelenka | 123/415 |
| 3,986,006 | 10/1976 | Kawai et al. | 364/431.05 |
| 4,015,572 | 4/1977 | Leshner et al. | 123/430 |
| 4,018,087 | 4/1977 | Wenz | 73/462 |
| 4,026,251 | 3/1977 | Schweitzer et al. | 123/436 |
| 4,052,663 | 10/1977 | Lindsey | 73/116 |
| 4,055,995 | 11/1977 | Armstrong et al. | 73/116 |
| 4,058,709 | 11/1977 | Long | 364/424 |
| 4,064,747 | 12/1977 | Rackliffe et al. | 73/116 |
| 4,064,846 | 12/1977 | Latsch et al. | 123/483 |
| 4,073,270 | 2/1978 | Endo | 364/431.05 |
| 4,104,990 | 8/1978 | Frobenius | 123/436 |
| 4,112,879 | 9/1978 | Assenheimer et al. | 123/478 |
| 4,127,092 | 11/1978 | Fresow et al. | 123/416 |
| 4,130,863 | 12/1978 | Schweitzer et al. | 123/416 |
| 4,161,162 | 2/1979 | Latsch et al. | 123/478 |
| 4,172,433 | 10/1979 | Bianchi et al. | 123/435 |
| 4,188,920 | 2/1980 | Bianchi et al. | 123/436 |

OTHER PUBLICATIONS

Randall et al.: Closed Loop Control of Internal Combustion Engine Efficiency and Exhaust Emissions, Stanford University Report DOT-OS-30111, May 1976, pp. 29-34.

*Primary Examiner*—Felix D. Gruber
*Attorney, Agent, or Firm*—Russel C. Wells; Gaylord P. Haas, Jr.; James R. Ignatowski

[57] ABSTRACT

Closed loop timing and fuel distribution controls for an internal combustion engine operative to control the timing and fuel delivery to each engine combustion chamber is disclosed herein. The closed loop timing and fuel distribution controls are closed about the instantaneous rotational velocity of the engine's output shaft and generate timing and fuel correction signals operative to modify the timing functions of the engine as well as the quantity of fuel delivered to each of the engine's combustion chambers. The control generates from the crankshaft's instantaneous rotational velocity a profile of each torque impulse imparted to the engine's output shaft and computes the phase angle signal indicative of the phase angle of each torque impulse to generate a timing correction signal indicative of the difference between the computed phase angle signal and a desired phase. The control further distribution computes the torque of each torque impulse and generates a torque correction signal indicative of the difference between the generated torque and average torque values. The two correction signals applied to an engine control modify the timing and fuel control signals being generated to cause the phase angle of the generated torque impulses to occur at the desired phase angle and the fuel delivery to each combustion chamber to be increased or decreased by an amount corresponding to the value of the torque correction signals. The torque corrected fuel delivery signals equalize the torque contribution of each combustion chamber to the total output torque of the engine.

116 Claims, 5 Drawing Figures

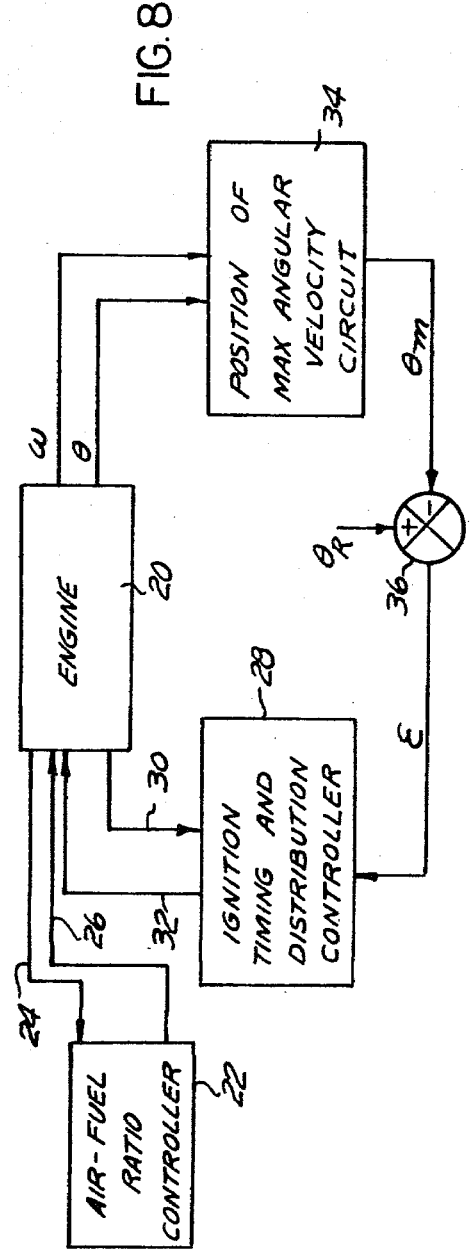

CLOSED LOOP TIMING AND FUEL DISTRIBUTION CONTROLS

CROSS REFERENCE TO AND INCORPORATION OF RELATED CO-PENDING APPLICATIONS

This application is one of six applications originally filed on May 8, 1978 all commonly assigned and having substantially the same specification and drawings, the six applications being identified below:

| Parent Serial Number | Continuation Serial Number | Filing Date | Title |
|---|---|---|---|
| 904,129 | — | 5/8/78 | Warm Up Control for Closed Loop Engine Roughness Fuel Control |
| | Issued 4/15/80 as U.S. Pat. No. 4,197,767 | | |
| 904,131 | 187,400 | 9/15/80 | Closed Loop Timing and Fuel Distribution Control |
| 904,132 | 188,803 | 9/19/80 | Digital Roughness Sensor |
| 904,137 | 187,392 | 9/15/80 | Timing Optimization Control |
| 904,138 | 187,393 | 9/15/80 | Integrated Closed Loop Engine Control |
| | Issued 8/31/82 as U.S. Pat. No. 4,347,571 | | |
| 904,139 | 187,394 | 9/15/80 | Closed Loop Engine Roughness Control |
| | Issued 8/10/82 as U.S. Pat. No. 4,344,140 | | |

S.N. 904,131; 904,132; 904,137; 904,138 and 904,139 now abandoned.

Application Ser. No. 904,129, now U.S. Pat. No. 4,197,767, has been printed in its entirety, including FIGS. 1-56, and the specification of that patent is specifically incorporated herein by reference.

FIELD OF THE INVENTION

The invention is related to internal combustion engine timing and fuel controls, and in particular to a closed loop timing and fuel distribution control responsive to the instantaneous rotational velocity of the engine's crankshaft modifying the timing and fuel delivery signals to each of the engine's combustion chambers to optimize the conversion of the combustion energy to rotational torque and to equalize the torque contribution of each of the engine's combustion chambers to the total torque output of the engine.

PRIOR ART

Electronic ignition and fuel control systems for internal combustion engines are finding acceptance in the automotive and allied industries as rigid efficiency and pollution standards are imposed by the government. The first generation of these electronic controls were open loop systems which became progressively complex as the standards were raised. The number of variables needed to be detected as well as auxiliary circuits for providing corrections for these variables increased with each raising of the standards. From the conception of electronic control systems for internal combustion engines, it has been known that if the control systems could be closed about the engine, simpler control systems could be developed. This would reduce the number of variables needed to be detected, reduce the complexity of the control systems, and at the same time improve the overall efficiency. The problem that has plagued the industry is the selection of an appropriate engine parameter about which to close the loop.

K. W. Randall and J. D. Powell from Stanford University in their research under a Department of Transportation sponsored project determined that for maximum efficiency of an internal combustion engine, the spark timing should be adjusted to provide a maximum cylinder pressure at a crankshaft angle 15 degrees past the piston's top dead center position. The results of this investigation are published in a Final Report NO SU-DAAR-503 entitled "Closed Loop Control of Internal Combustion Engine Efficiency and Exhaust Emission". The report contains a block diagram of a closed loop system in which a sensor detects the angle at which peak pressure occurs then compares this measured angle with the desired 15° angle. An error signal, generated when the measured angle differs from the desired angle, is used to correct the ignition timing signal generated in response to the other sensed engine parameters.

Comparable closed loop ignition control systems closed about the cylinder pressure are disclosed by M. M. Peterson in U.S. Pat. No. 3,957,023 entitled "Pressure Responsive Engine Ignition System" issued May 19, 1976 and Sand in U.S. Pat. No. 3,977,373 "Closed Loop Combustion Pressure Control" issued Aug. 31, 1976.

An alternate closed loop ignition control system taught by Pratt, Jr. et al in U.S. Pat. No. 3,897,776 entitled "Apparatus Adapted to Opto-Electrically Monitor the Output of a Prime Mover to Provide Signals which are Fed Back to the Input and Thereby Provide Control of the Prime Mover" issued Aug. 5, 1975 embodies a torque sensor which measures the twist in the output shaft of the prime mover to measure the torque. The measured torque and engine speed are used to close the loop about the engine.

Harned et al in U.S. Pat. No. 4,002,155 entitled "Engine and Engine Spark Timing Control with Knock Limiting, etc." issued Jan. 11, 1977 teaches a closed loop ignition system in which engine knock-induced vibrations are detected by an engine mounted accelerometer. The system counts the number of individual ringing vibrations that occur in a predetermined angular rotation of the crankshaft. When the number of ringing vibrations exceed a predetermined number, the engine spark timing is retarded and when the number of ring vibrations is less than a second predetermined number, the spark timing is advanced.

Wahl in U.S. Pat. No. 4,015,566 entitled "Electronic Ignition Control System for Internal Combustion Engines" issued Apr. 5, 1977 teaches a closed loop ignition timing system closed about an operational parameter of the engine. In the patent, Wahl teaches sensing the temperature of a catalytic converter, the exhaust gas composition (especially NO compounds), or in the alternative using a vibration sensor to detect a rough running engine. The use of engine roughness as the measured parameter is similar to the system taught by Harned in U.S. Pat. No. 4,002,155 discussed above. In still another type of close loop system, Schweitzer et al in U.S. Pat. No. 4,026,251 entitled "Adaptive Control System for Power Producing Machines" issued May 31, 1977 teaches dithering the ignition timing and closing the loop about the engine's speed.

The closed loop ignition timing systems in which the cylinder pressure is measured directly as taught by Randall and Powell and implemented in the patents to Peterson and Sand appear as the most direct and effective engine parameter about which to close the loop. However, this method requires a pressure transducer to be incorporated into at least one of the engine's cylinders where it is exposed to high temperatures and high pressures. Such pressure sensors are costly, have relatively short life expectancies and require additional modification to the engine for their use. Alternatively, pressure sensors adapted to be used in conjunction with the spark plugs are known but still suffer from the first listed deficiencies. The direct measurement of engine torque as taught by Pratt, Jr. et al is an alternate approach but requires a relatively complex and expensive torque measuring sensor. The measurement of the onset of engine knock or roughness as taught by Harned et al and Wahl respectively are believed to be too inaccurate to meet today's standards while the system taught by Schweitzer is believed to be ineffective because factors other than ignition timing such as a change in load could affect the engine speed and result in improper ignition timing.

Various types of closed loop fuel control systems for internal combustion engines have been developed in which the loop is closed about different engine parameters. The one of the parameters about which the loop is closed is the composition of the exhaust gas as taught by Seitz in U.S. Pat. No. 3,815,561 "Closed Loop Engine Control System" issued June 11, 1974 as well as many others. The system taught by Seitz uses an oxygen ($O_2$) sensor detecting the concentration of oxygen in the exhaust gas and closes the loop about a stoichiometric mixture of air and fuel. However, a stoichiometric mixture of air and fuel has been found to be too rich for the efficient operation of the engine. Various techniques have been employed to operate the engine at leaner air fuel ratios but the ability to achieve reliable closed loop control at the desired leaner mixture is limited by the characteristics of the present day oxygen sensors.

An alternate approach is taught by Taplin et al in U.S. Pat. No. 3,789,816 "Lean Limit Internal Combustion Engine Roughness Control System" issued Feb. 5, 1974 in which engine roughness is detected as the parameter about which the loop is closed. In this system, the air-fuel mixture is leaned out until a predetermined level of engine roughness is achieved. The magnitude of engine roughness is selected to correspond with a level of engine roughness at which the air fuel mixture is made as lean as possible to the point that the formation of such exhaust gas as HC and CO is minimized without the drivability of the particular vehicle being unacceptable. Engine roughness as measured in the Taplin et al patent is the incremental change in the rotational velocity of the engine's output as a result of the individual torque impulses received from each of the engine's cylinders. The closing of the fuel control loop about engine roughness appears to be the most effective means for maximizing the fuel efficiency of the engine.

Leshner et al in U.S. Pat. No. 4,015,572 teaches a similar type of fuel control system in which the loop is closed about engine power. In their preferred embodiment, Leshner et al use exhaust back pressure as a manifestation of engine power, however, state that a measured torque, cylinder pressure, or a time integral of overall combustion pressure for one or more engine revolutions at a given RPM may be used in the alternative. In a more recent advertising brochure "Breaking the Lean Limit Barrier", Fuel Injection Development Corporation of Bellmawr, N.J., the assignee of the Leshner et al patent, states that the parameter measured is the velocity of the engine's flywheel.

In another type of fuel control system using engine roughness as the sensed parameter to close the loop, Bianchi et al in U.S. Pat. No. 4,044,236 teaches measuring the rotational periods of the crankshaft between two sequential revolutions of the engine. The differential is digitally measured in an up down counter counting at a frequency proportional to the engine speed.

In an alternate type of roughness closed loop fuel control system, Frobenius et al in U.S. Pat. No. 4,044,234 "Process and Apparatus for Controlling Engine Operation Near the Lean-Running Limit" issued August, 1977, teaches measuring the rotational periods of two equal angular intervals, one before and one after the top dead center position of each piston. The change in the difference between the two rotational periods for the same cylinder is compared against a particular reference value and an error signal is generated when the change exceeds the reference value. Frobenius in U.S. Pat. No. 4,044,235 "Method and Apparatus For Determining Smooth Running Operation in an Internal Combustion Engine" issued August, 1977 teaches an alternate roughness control system wherein the periods of three sequential revolutions are compared to determine engine smoothness. The above reflects various ways in which engine roughness as detected by various means including the variations in the rotational velocity of the flywheel is used to close the loop about the engine.

The prior art teaches independent closed loop control systems, in which each control, i.e., ignition timing, fuel control, and fuel distribution are treated as separate entities. The Applicants herein teach an integrated engine control system in which the control loops for each controlled parameter are closed about a single measured engine operating parameter and in particular, the instantaneous rotational velocity of the engine's crankshaft. The data obtained from the singularly measured parameter is processed in different ways to generate timing and fuel delivery correction signals optimizing the conversion of combustion energy to rotational torque by the engine.

BRIEF DESCRIPTION OF THE DRAWINGS

FIG. 8 is a block diagram of the disclosed Closed Loop Timing Control.

SUMMARY OF THE INVENTION

Figure 13:
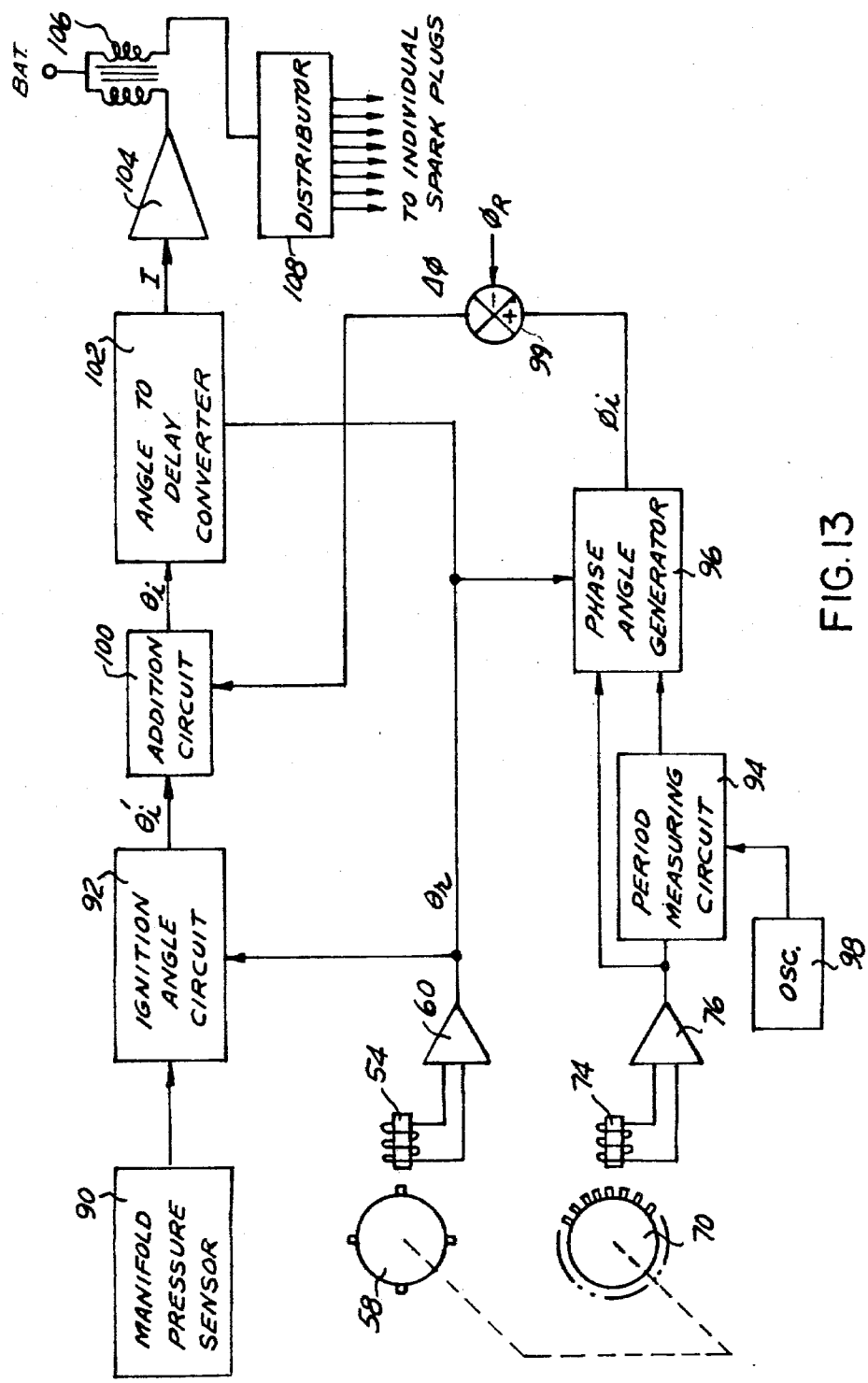
FIG. 13 is a block diagram of the preferred embodiment of the Closed Loop Ignition Control shown in FIG. 8.
Figure 14:
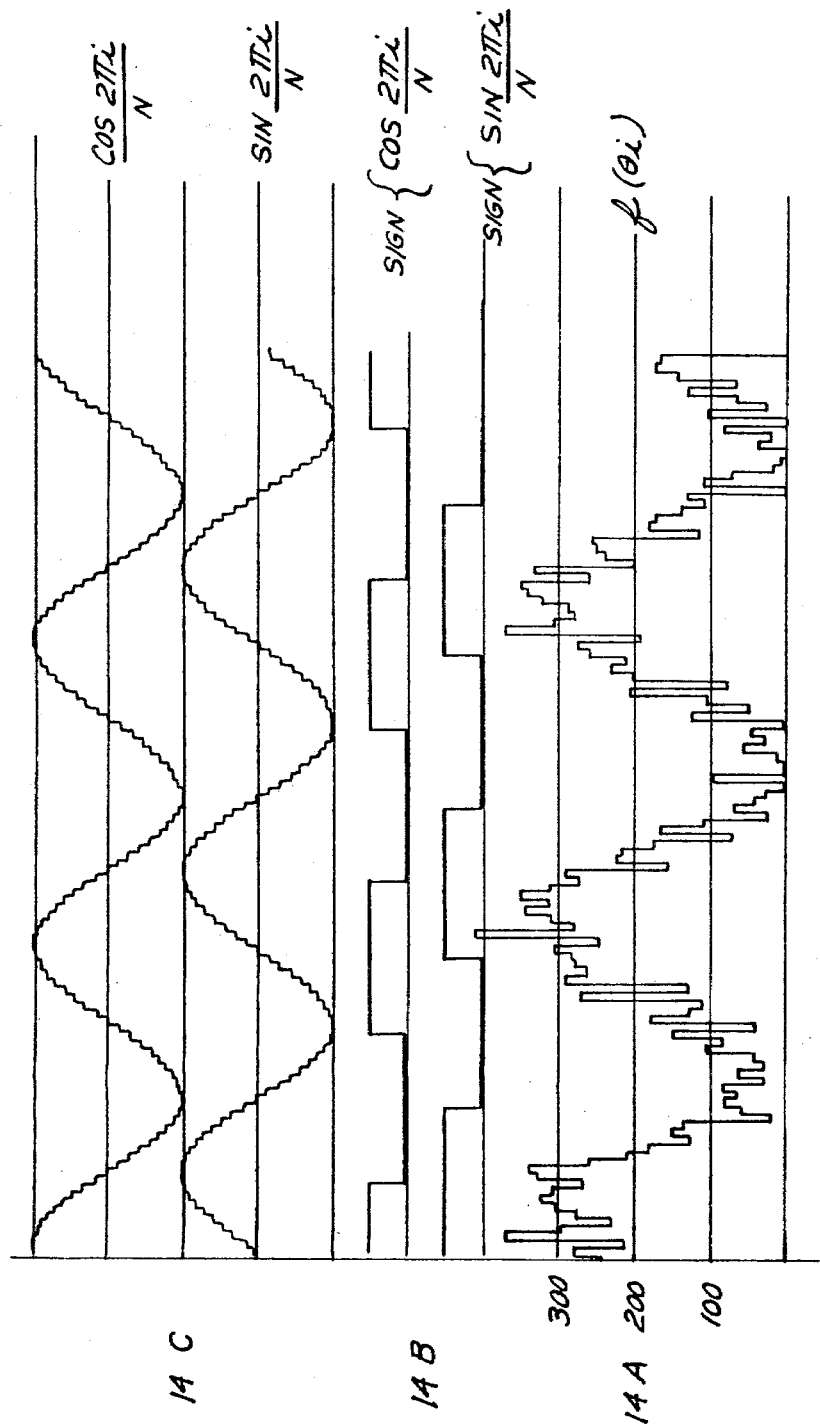
FIG. 14A shows an actual period waveform generated in accordance with the circuit of FIG. 8.
FIG. 14B illustrates the square wave function SIGN (sin $2\pi i/N$) and SIGN (cos $2\pi i/N$).
FIG. 14C illustrates the actual function (sin $2\pi i/N$) and (cos $2\pi i/N$).
Figure 15:
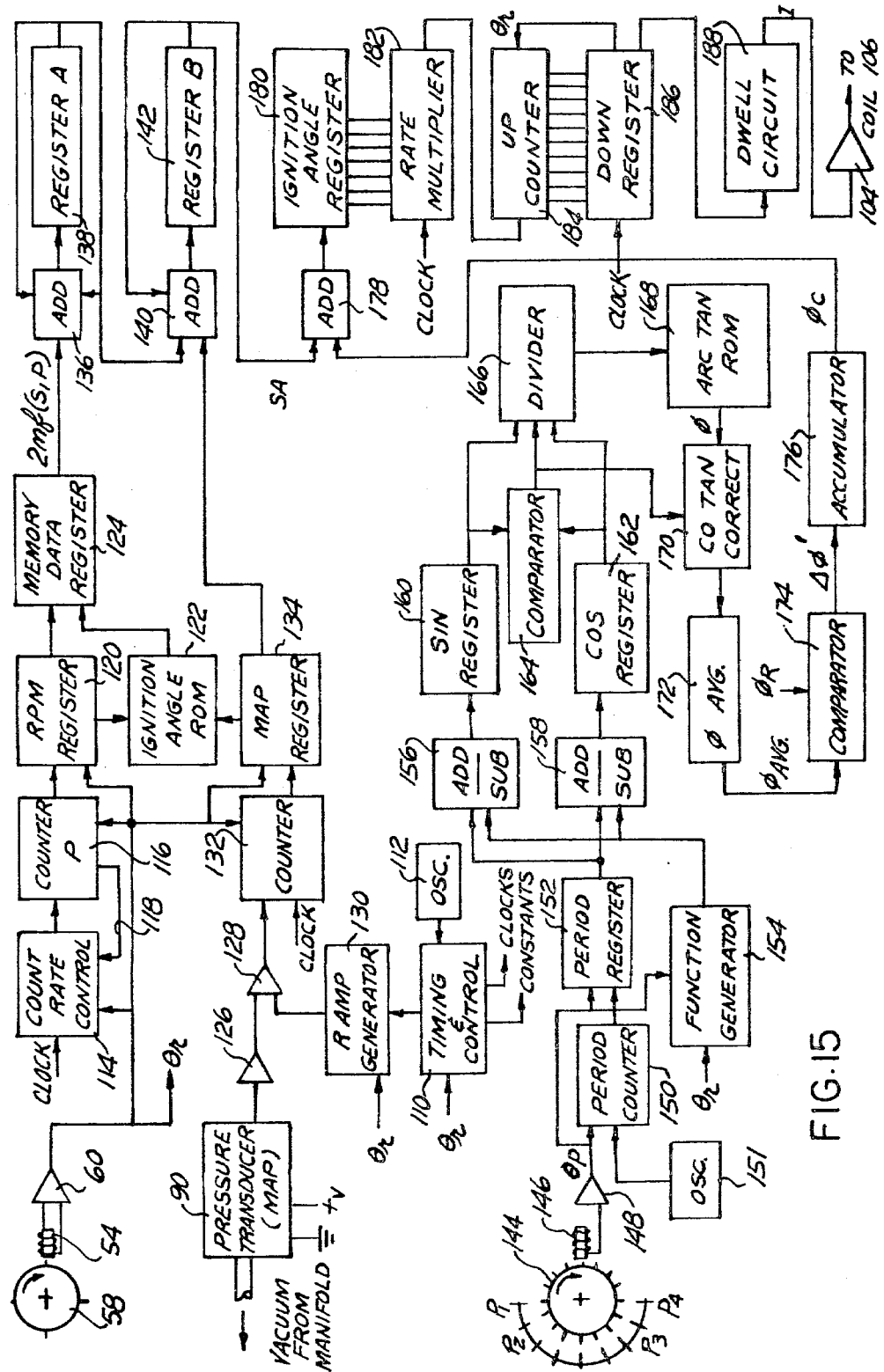
FIG. 15 is a more detailed block diagram of the preferred embodiment of FIG. 13.
Figure 44:
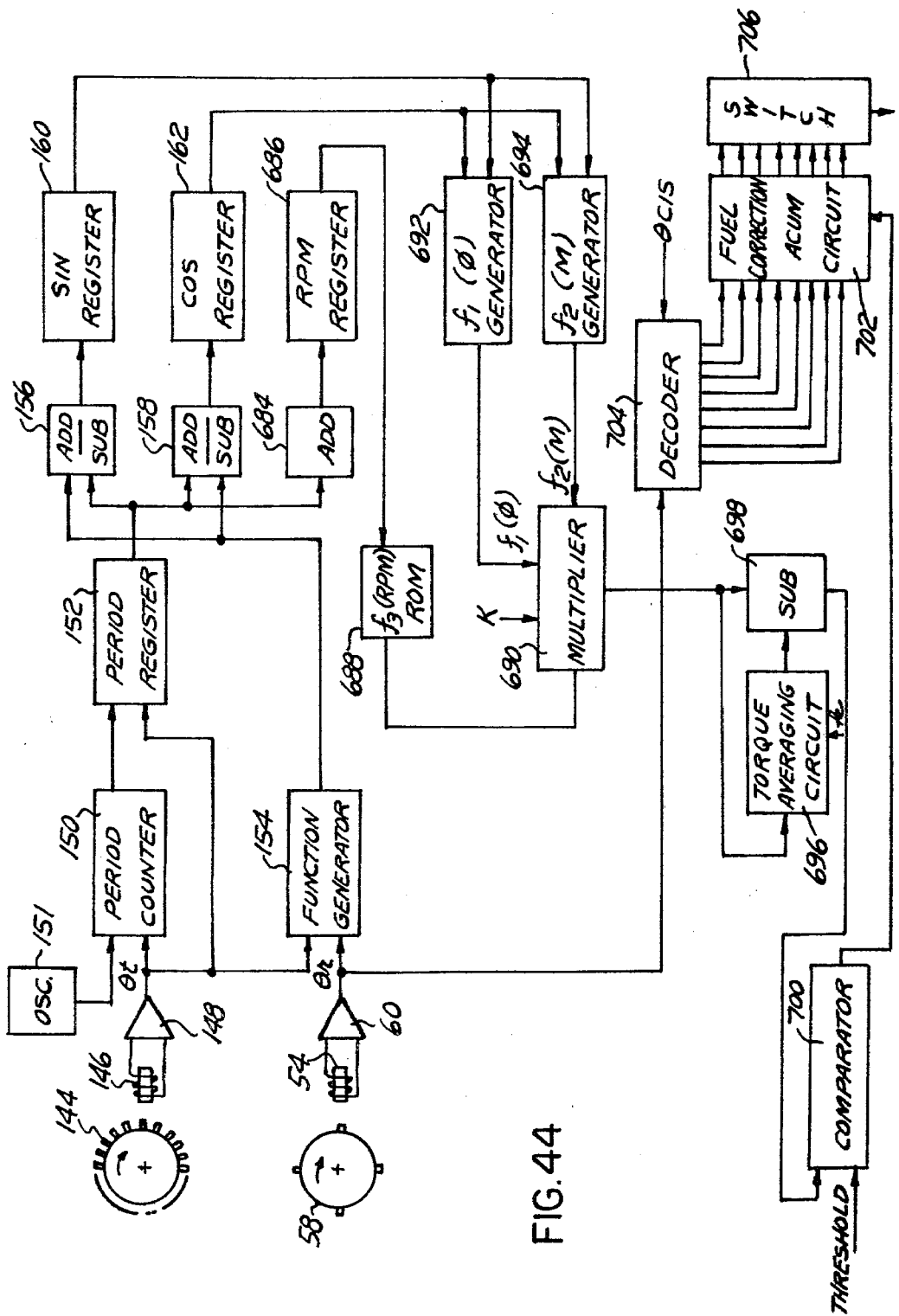
FIG. 44 is a block diagram showing the Closed Loop Fuel Distribution Control.

The invention is a closed loop timing and fuel distribution control for an internal combustion closed about the instantaneous rotational velocity of the engine's output shaft for generating correction signals operative to modify timing and the fuel delivery signals for each of the engine's combustion chambers. The modified timing corrections signals modifying the phase angle of each torque impulse to occur at a predetermined angle and the fuel delivery correction signals balancing the torque contributions of each combustion chamber to the total torque output of the engine. The timing and distribution controls in response to the torque impulses imparted to the engine's output shaft by the burning of an air/fuel mixture in each combustion chamber and a signal indicative of the engine's speed, generates timing and torque correction signal for each combustion chamber. The control generates from the instantaneous rotation velocity of the output shaft, a first function signal $f_1(\phi)$ having a value indicative of the phase angle at which the engine's crankshaft has a maximum rotational velocity in response to each torque impulse. The function signal $f_1(\phi)$ is compared with a desired phase angle for the torque impulses to generate timing correction signals indicative of the difference between the function signal $f_1$ (100) and the desired value. The control further generates a second function signal $f_2(M)$ indicative of the magnitude of each torque impulse. The signals $f_1(\phi)$ and $f_2(M)$ are multiplied together and with a third function signal $f_3$ (RPM) indicative of the average rotational speed of the engine to generate a torque signal "T" for each torque impulse having a value $$T = f_1(\phi) \cdot f_2(M) \cdot f_3(RPM) \cdot K$$

where K is a correction value constant.

The torque computed for each combustion chamber is compared with an average torque value to generate a torque difference signal. The torque difference signals are compared with a threshold value indicative of the nominal combustion variations in the torque impulses generated by the same combustion chamber to determine if the generated difference signal is greater or less than the threshold. The difference signals greater than the threshold value are individually accumulated to generate a torque correction signal for each combustion chamber. The torque correction signals are extracted from the individual accumulators one at a time in a predetermined sequence and applied to the fuel control computer where they modify the quantity of fuel to be delivered to each combustion chamber. The timing correction signals modify the time at which the fuel is delivered to the combustion chambers in the case of a diesel engine or the time at which the fuel is ignited in a spark ignited engine.

The object of the invention is to generate from the instantaneous rotational velocity of the engine's crankshaft correction signals individually correcting the fuel delivery to each of the engine's combustion chambers to equalize the torque contribution of each combustion chamber to the engine's total output torque. Another object of the invention is to compute a signal indicative of the torque generated by the combustion of an air/fuel mixture in each combustion chamber from the magnitude of the torque impulse imparted to the engine's crankshaft, the angle at which the crankshaft has a maximum rotational velocity as a result of the torque impulse, and the rotational speed of the engine. Still another object of the invention is a distribution control in which the correction signals are generated for those combustion chambers generating torques differing from the average torque by more than a threshold value. A further object of the invention is a closed loop timing control for an internal combustion engine in which the time at which the fuel is delivered to the engine's combustion chamber is closed about the instantaneous velocity of the engine's output shaft. Another objective of the invention is a closed loop injection timing control in which the phase angle is computed by digital period analysis of the individual torque impulses. A still further object of the invention is a closed loop ignition timing control in which the time at which the ignition signals generated is closed about the engine. Another object of the invention is a closed loop ignition timing control in which the ignition timing is closed about the instantaneous rotational velocity of the engine's crankshaft. Yet another object of the invention is a closed loop ignition timing control in which the time at which the ignition signals are generated is closed about the phase of the torque impulses generated by the individual engine cylinders.

A final objective of the invention is a closed loop ignition timing control in which the phase angle is computed by digital period analysis of the individual torque impulses.

These and other objectives will become apparent from a reading of the specification with reference to drawings.

What is claimed is:

1. A closed loop timing control for an internal combustion engine having at least one combustion chamber delivery means for delivering a combustible mixture of air and fuel to said at least one combustion chamber and a rotating element receiving rotational torque impulse generated in response to the burning of the air/fuel mixture in the combustion chamber, the closed loop timing control comprising:

first sensor means for generating reference signals indicative of at least one rotational position of the engine's rotating element;

second sensor means for generating a velocity signal indicative of the rotational velocity of the rotating element as a function of the rotating element's angular position;

timing generator means responsive to said reference and velocity signals for generating timing signals indicative of the time fuel is to be delivered to the combustion chamber such that the torque impulse generated by the burning of the air/fuel mixture imparts a maximum rotational velocity to the rotating member at a predetermined angle with respect to said reference signal;

third sensor means for generating a third signal indicative of at least one operational parameter of the engine; and means responsive to said third signal, said reference signals and said timing signal for generating injection signals actuating said delivery means to deliver a quantity of fuel to the combustion chamber determined by said third signal at a time determined by said timing signal.

2. The closed loop timing control of claim 1 wherein said engine is a reciprocating piston engine wherein said combustion chamber has at least one cylinder having a piston reciprocating therein.

3. The closed loop timing control of claim 2 wherein said at least one cylinder is a plurality of cylinders, said first sensor means generates a reference signal at predetermined rotational position of the rotating element with respect to each of said plurality of cylinders.

4. The closed loop timing control of claims 1 or 3 wherein said timing generator means comprises:

means for generating an angle signal indicative of the angle between said reference signal and the angle at which said rotating element has a maximum rotational velocity in response to said reference and velocity signals; and means for combining said angle signal with said reference signal to generate said timing signal.

5. The closed loop timing control of claim 1 or 3 wherein said timing generator means is further responsive to said third signal to generate said timing signals, said timing generator means further comprises:

means responsive to said reference and third signal to generate an intermediate timing signal;

means for generating an angle signal indicative of the angle between said reference signal and the angle at which said rotating element has a maximum rotational velocity; and means for combining said intermediate timing signal with said angle signal to generate said timing signal.

6. The closed loop timing control of claim 5 wherein said means for generating an angle signal is a phase angle generator generating a phase angle signal for each torque impulse imparted to the rotating member, wherein said phase angle signal is indicative of said angle signal.

7. The closed loop timing control of claim 6 wherein said timing generator means further comprises:

means for generating a reference phase angle signal;

error signal generator for generating an error signal having a value indicative of the difference between said phase angle signal and said reference phase angle signal; and accumulator means for accumulating said error signals to generate said angle signal having a value indicative of the sum of said error signals.

8. The closed loop timing control of claim 6 wherein said phase angle generator comprises:

means for generating function signals indicative of the values $A \sin \phi$ and $A \cos \phi$ having values indicative of the sin and cos Fourier coefficients of each torque impulse in response to said reference and velocity signals where $\phi$ is the phase angle of the torque impulse and A is indicative of the amplitude of each torque impulse;

converter means for converting said function signals to said phase angle signal.

9. The closed loop timing control of claim 8 wherein said converter means generates said phase angle signal having a value proportional to the angle $\phi$ where $\phi$ is an angle having a value equal to the arctangent $(A \sin \phi / A \cos \phi)$.

10. The closed loop timing control of claim 9 wherein said converter means comprises:

$\phi$ comparator means for comparing the value $A \sin \phi$ with the value of $A \cos \phi$ to generate a numerator signal indicative of the function signal having the smaller value;

divider means for dividing the function signal having the smaller value by the function signal having the larger value to generate a quotient signal;

means for converting said quotient signal to an arctan signal having a value indicative of the arctangent of said quotient signal; and means for converting said arctan signal to said phase angle in response to said numerator signal where said phase signal has a value $\phi$ equal to:

$$\phi = \text{arctangent } (A \sin \phi / A \cos \phi)$$

when said numerator signal is indicative of the value of $A \sin \phi$ being smaller than the value of $A \cos \phi$ and $$\phi = \pi/2 - \text{arctangent } (A \cos \phi / A \sin \phi)$$

when the numerator signal is indicative of the value of $A \cos \phi$ cos being smaller than the value of $A \sin \phi$.

11. The closed loop timing control of claim 8 wherein each torque impulse is measured over a predetermined angular rotational interval of the rotating member, said second sensor means comprises:

means for generating period identification signals, each period identification signal indicative of an angular rotational increment equal to one fourth of said angular rotational interval;

means responsive to said period identification signals for generating period signals $P_1$, $P_2$, $P_3$, and $P_4$ indicative of the time required for the rotating member to sequentially rotate through each of said angular rotatational increments; and wherein said means for generating function signals is a means for summing said period signals, $P_1$, $P_2$, $P_3$, and $P_4$ in accordance with the relationships:

$$A \sin \phi \approx 1/N [(P_1 - P_3) - (P_2 - P_4)]$$

and $$A \cos \phi \approx 1/N [(P_1 - P_3) - (P_2 - P_4)]$$

where N is the number of period signals.

12. The closed loop timing control of claim 11 wherein said means for summing comprises:

first storage means for storing said function signal having a value $A \sin \phi$;

second storage means for storing said function signal having a value $A \cos \phi$;

first gate means responsive to period identification signals for gating said period signals to said first storage means in accordance with the relationships:

$$A \sin \phi \approx P_1 + P_2 - P_3 - P_4$$

and second gate means responsive to said period identification signals for gating said period signal to said second storage means in accordance with the relationships:

$$A \cos \phi \approx P_1 - P_2 - P_3 + P_4.$$

13. The closed loop timing control of claim 12 wherein the engine includes a ring gear attached to said rotating member, said ring gear having a plurality of teeth disposed about its circumference at equal angular intervals, and wherein a predetermined number of said teeth define a rotational angle equal to said predetermined angular rotation level, and said second sensor means includes means for generating a tooth signal each time one of the ring gear teeth passes a predetermined fixed position; and said means generating period identification signals comprises:

a first counter for counting said tooth signals and storing a number indicative of the number of tooth signals generated after each reference signal said counter being reset by each of said reference signals;

decoder means for sequentially generating said period identification signal in response to the number of counts stored in said first counter;

wherein said means for generating period signals comprises:

an oscillator generating output signals at a rate substantially higher than the frequency of said tooth signals;

a second counter counting and storing said output signals during each period identification signal to generate a number indicative of the time required for the rotating member to rotate through each angular rotational increment wherein said numbers are said period signals.

14. The closed loop timing control of claim 12 wherein said engine includes period reference markers attached to the rotating member spaced at angular increments equal to one fourth of said predetermined angular interval and said second sensor includes means for generating marker signal in response to said period reference markers passing a fixed position;

wherein said means for generating period identification signals comprises:
a third counter for counting and storing a number indicative of the marker signals received after each reference signal;
a second decoder for generating said period identification signals in response to the number stored in said fourth counter;

wherein said means for generating said period signals comprises:
an oscillator for generating output signals at a rate substantially higher than said marker signals; and
fourth counter means for counting and storing said output signals generated during each period identification signal, wherein the numbers stored in said fourth counter are said period signals.

15. The closed loop timing control of claim 5 wherein third sensor means includes means for generating signals indicative of at least two operational parameters of the engine.

16. The closed loop timing control of claim 15 wherein said engine includes an air intake manifold delivering a metered quantity of air to the engine, said third sensor means comprises a speed sensor generating a signal indicative of the engine speed and a pressure sensor generating signals indicative of air pressure in the engine's air intake manifold.

17. A method for generating timing signals for an internal combustion engine having at least one combustion chamber means for delivering a combustible mixture of air and fuel in response to engine operation parameters, and a rotating element receiving rotational torque impulses generated in response to the combustion of the air/fuel mixture in the at least one combustion chamber, comprising the steps of:

detecting at least one operational parameter of the engine to generate a parameter signal;

generating from said parameter signal intermediate angle signals indicative of the rotating elements angle, measured from a fixed reference, at which the delivery of the fuel to the combustion chamber would cause the rotating element to have a maximum rotational velocity in response to torque impulses generated by the combustion of the air/fuel mixture in said at least one combustion chamber;

detecting the rotation of the rotating element to generate a velocity signal indicative of the rotating element's instantaneous rotational velocity as a function of the rotating element's rotational position;

generating from said velocity signal, a first signal indicative of the angle at which the rotating element has a maximum rotational velocity in response to each torque impulse generated by the combustion of said air/fuel mixture in said at least one combustion chamber;

comparing said first signal with a second signal indicative of a predetermined angle to generate a correction signal indicative of the difference between said first signal and said second signal;

summing said correction signal with said intermediate angle signal to generate a sum angle signal; and converting said sum signal to a timing signal, said timing signal modified by said correction signal activating the means for delivering a combustible air/fuel mixture to the combustion chamber at a time operative to cause the rotating element to have a maximum rotational velocity at said predetermined angle.

18. The method of claim 17 wherein the engine has more than one combustion chamber, said method further includes the step of generating reference signal indicative of predetermined rotational positions of the engine's rotating member with respect to each torque impulses generated by the burning of the air/fuel mixture in each combustion chamber; and said step of generating a first signal, generates from said velocity and reference signals a first signal for each torque impulse generated by the combustion of the air/fuel mixture in each of said more than one combustion chamber.

19. The method of claim 17 wherein said step of generating an intermediate angle signal includes the step of generating said intermediate angle signal from parameter signals indicative of at least two operational parameters of the engine.

20. The method of claim 18 wherein said engine includes an air intake manifold supplying a metered quantity of air to the engine, said step of generating an intermediate angle signal generates said intermediate angle signal in response to a parameter signal indicative of the engine's rotational speed, and a parameter signal indicative of the air pressure in the air intake manifold, and said reference signal.

21. The method of claim 20 wherein said step of generating said first signal generates a phase angle signal for each torque impulse wherein the phase angle signal is indicative of said first signal.

22. The method of claim 21 wherein said step of generating said phase angle signal includes the steps of:

generating period reference signals dividing each torque impulse in four equal crankshaft rotational angular intervals;

sensing the time between sequential period reference signals to generate period signals indicative of the time required for the crankshaft to rotate through each of said four equal crankshaft rotational intervals;

summing said period signals to generate function signals indicative of the sin and cos Fourier coefficients of each torque impulse;

dividing said function signals to generate a quotient signal;

converting said quotient signal to said phase angle signal.

23. The method of claim 22 wherein said four period signals in the sequential order in which they are generated are designated $P_1$, $P_2$, $P_3$, and $P_4$, said step of summing said period signals comprises the steps of:

summing said period signals in accordance with the relationships:

$A \sin \phi \approx 1/N \ (P_1+P_2-P_3+P_4)$ to generate a sin signal; and summing said period signal in accordance with the equation:

$A \cos \phi \approx 1/N \ (P_1-P_2-P_3+P_4)$ to generate a cos signal where N is equal to the number of period signals.

24. The method of claim 22 wherein said step of dividing includes the steps of:
- comparing the absolute value of said sin signal with the absolute value of said cos signal to generate a numerator signal indicative of the function signal having the smaller absolute value;
- dividing in response to said numerator signal the smaller of said function signals by the larger signal to generate said quotient signal.

25. The method of claim 23 or 24 wherein said step of converting said quotient signal further includes the steps of:
- addressing a memory storing arctangent values corresponding to the values of the quotient signal with said quotient signal to read out a signal having a value indicative of the arctangent of said quotient signal;
- converting the signal indicative of the arctangent to said phase angle having a value $\phi$ in response to said numerator signal according to the equations:

$\phi = \arctan (A \sin \phi / A \cos \phi)$ when said numerator signal is indicative of said sin signal having an absolute value smaller than said cos signal; and $\phi = \pi/2 - \arctan (A \cos \phi / A \sin \phi)$ when said numerator signal is indicative of said cos signal having an absolute value smaller than said cos signal.

26. The method of claim 20 wherein said step of comparing said first signal with a second signal further includes the steps of:
- summing sequentially generated first signals to generate an average first signal;
- generating said second signal having a value indicative of a predetermined phase angle at which a maximum rotational velocity of the rotating element is desired;
- subtracting said second signal from said average first signal to generate a difference signal; and
- accumulating successively generated difference signals to generate said correction signal.

27. The method of claim 20 wherein said step of converting said sum signal to a timing signal includes the steps of:
- rate multiplying said sum signal to generate a rate signal having a pulse frequency proportional to the value of said sum signal;
- counting up and storing the pulses of said rate signal in a counter during a first interval between sequentially generated reference signals to generate a number indicative of a delay time;
- transferring said number to a down counter at the end of said first interval;
- counting down the number transferred to the down counter at a predetermined rate during a second interval immediately following said first interval to generate a delay time signal terminating when said down counter reaches zero counts, said delay time signal having a value proportional to the transferred number; and detecting the termination of said time delay signal to generate said timing signal.

28. A closed loop ignition timing control for an internal combustion engine having at least one combustion chamber, means for delivering a combustible mixture of air and fuel to the at least one chamber in a ratio which is a function of predetermined engine operational parameters, ignition means associated with the at least one engine chamber to ignite the delivered air/fuel mixture, and a rotable element receiving torque impulses generated in response to the burning of the air/fuel mixture comprising:
- first sensor means for sensing at least one engine operating parameter and generating signals representing a characteristic of said at least one engine operating parameter;
- second sensor means for generating signals indicative of a characteristic of the instantaneous velocity of the engine's rotable element;
- means for generating a correction signal in response to said second sensor means signals; and
- ignition signal generating means for generating ignition signals in response to said first sensor means signal and said correction signal adapted to energize the ignition means at a time operative to cause the burning of the air/fuel mixture in said at least one chamber to impart a maximum rotational velocity to the rotable member at a predetermined angle with respect to a reference position of the movable member.

29. The closed loop ignition timing control of claim 28 wherein said instantaneous velocity characteristic is the angle at which the peak velocity occurs relative to a reference position of the rotable element.

30. The closed loop ignition timing control of claim 29 wherein:
- said first sensor means generates a reference signal indicative of the rotable elements reference position; and
- wherein said second sensor means comprises:
- means detecting the rotation of the rotable element for generating torque impulse profile signals for each torque impulse indicative of the rotational velocity of the rotable element as a function of the rotable element's rotational angle with respect to said reference position; and
- means for differentiating the torque impulse profile signals to generate an angle signal indicative of the angle at which said rotable element has a peak rotational velocity.

31. The closed loop ignition timing control of claim 30 wherein said means for generating a correction signal comprises:
- means for generating a reference angle signal;
- means for subtracting said reference angle signal from said angle signals to generate an error signal; and
- accumulator means for accumulating said error signals to generate said correction signal.

32. The closed loop ignition timing control of claim 30 wherein said means for generating a correction signal comprises:
- means for generating a reference angle signal;
- averaging means for averaging said angle signals to generate an average angle signal;
- means for subtracting said reference angle signal from said average angle signal to generate an error signal; and accumulator means for accumulating said error signals to generate said correction signal.

33. The closed loop ignition timing control of claim 30 wherein each torque impulse is measured over a predetermined rotational interval of the rotable element, said means for generating profile signals comprises:

angle encoder means attached to said rotable element for generating a predetermined number of angle increment signals within each of said predetermined rotational interval;

means responsive to said reference and angle increment signals for generating instantaneous angle signals indicative of the instantaneous angle of the rotable element with respect to said reference signals;

means for generating instantaneous velocity signals indicative of the instantaneous rotational velocity of the rotable element between each of said angle increment signals.

34. The closed loop ignition timing control of claim 33 wherein said means for generating instantaneous angle signals is a first counter generating a number indicative of the number of angle increment signals received after each reference signal wherein said number is indicative of the instantaneous angle of the rotable element with respect to said reference signal.

35. The closed loop ignition timing control of claim 33 wherein said means for generating a signal indicative of the instantaneous rotational velocity of the rotable element comprises:

an oscillator generating oscillator signals at a rate substantially higher than the rate at which said angle increment signals are generated; and a second counter for generating a number indicative of the oscillator signals received between sequential angle increment signals.

36. The closed loop ignition timing control of claim 33 wherein said engine includes a ring gear attached to said rotable element and the ring gear has a plurality of teeth disposed about its periphery at equal angular intervals, said angle encoder is a tooth detector generating a signal each time a tooth on the ring gear passes the tooth detector.

37. The closed loop ignition timing control of claim 33 wherein said means for differentiating comprises:

subtraction means for generating a difference signal indicative of the difference between sequentially generated instantaneous rotational velocity signals;

detector means for detecting a predetermined change in the polarity of the sequentially generated difference signals to generating a hold signal;

means for storing in response to said hold signal the instantaneous angle signal corresponding to the rotation angle of the rotable element where the predetermined change in the polarity of the difference signals was detected wherein said stored instantaneous angle signal is said angle signal.

38. The closed loop ignition timing control of claim 29 further including a phase angle generator generating a phase angle signal indicative of the phase angle of each torque impulse with respect to said reference signals, wherein said phase angle is indicative of said angle signal.

39. The closed loop ignition timing control of claim 38 wherein said means for generating correction signals comprises:

means for generating a reference phase angle signal;

means for subtracting said reference phase angle signal from said phase angle signals to generate error signals; and accumulator means for generating said correction signal having a value indicative of the sum of said error signals.

40. The closed loop ignition timing control of claim 38 wherein said means for generating correction signals comprises:

means for averaging more than one phase angle signal to generate average phase angle signals;

subtraction means for subtracting said reference phase angle signal from said average phase angle signals to generate error signals; and accumulator means for generating said correction signal having a value indicative of the sum of said error signals.

41. The closed loop ignition timing control of claim 38 wherein said phase angle generator means comprises:

means for generating function signals indicative of the values $A \sin \phi$ and $A \cos \phi$ having values indicative of the sin and cos Fourier coefficients of each torque impulse in response to said torque impulse profile signals where $\phi$ is the phase angle of the torque impulse and A is a constant; and converter means for generating said phase angle signals from said function signals.

42. The closed loop ignition timing control of claim 41 wherein said converter means comprises means for generating said phase angle signals having a value proportional to the angle $\phi$ where $\phi$ is equal to the arctangent $(A \sin \phi / A \cos \phi)$.

43. The closed loop ignition timing control of claim 42 wherein said converter means comprises:

$\phi$ comparator means for comparing the value $A \sin \phi$ with the value of $A \cos \phi$ to generate a numerator signal indicative of the function signal having the smaller value;

divider means for dividing the function signal having the smaller value by the larger value to generate a quotient signal;

means for generating from said quotient signal said phase angle signal having a value indicative of the arctangent of said quotient signal; and means for converting said arctangent signal to said phase angle signal in response to said numerator signal where the phase angle signal has a value $\phi$ indicative of:

$\phi = $ arctangent $(A \sin \phi / A \cos \phi)$ when said numerator signal is indicative of the value of $A \sin \phi$ being smaller than the value of $A \cos \phi$ and a value $\phi = \pi/2 -$ arctangent $(A \cos \phi / A \sin \phi)$ when the numerator signal is indicative of the value of $A \cos \phi$ being smaller than the value of $A \sin \phi$.

44. The closed loop ignition timing control of claim 41 wherein each torque impulse is measured over a predetermined crankshaft angular rotational interval, said means for generating function signals comprises:

means detecting rotation of the rotatable element for generating period identification signals, each period identification signal indicative of a crankshaft angular rotational increments equal to one fourth of said crankshaft angular rotational intervals;

means responsive to said period identification signals for generating period signals $P_1$, $P_2$, $P_3$, and $P_4$ indicative of the time required for the crankshaft to sequentially rotate through each of said crankshaft angular rotational increments; and means for summing said period signals, $P_1, P_2, P_3,$ and $P_4$ in accordance with the relationships:

$$A \sin \phi \approx 1/N \ [(P_1-P_3)+(P_2-P_4)]$$

and $$A \cos \phi \approx 1/N \ [(P_1=P_3)-(P_2-P_4)]$$

where N is the number of period signals.

45. The closed loop ignition timing control of claim 38 wherein said means for summing comprises:
first storage means for storing said function signal having a value $A \sin \phi$;
second storage means for storing said function signal having a value $A \cos \phi$;
first gate means responsive to period identification signals for gating said period signals to said first storage means in accordance with the relationships
$$A \sin \phi \approx P_1 + P_2 - P_3 - P_4$$
and
second gate means responsive to said period identification signals for gating said period signal to said second storage means in accordance with the relationships:
$$A \cos \phi \approx P_1 - P_2 - P_3 + P_4.$$

46. The closed loop ignition timing control of claim 45 wherein the engine includes a ring gear attached to said rotable element, said ring gear having a plurality of teeth disposed about its circumference at equal angular intervals, and wherein a predetermined number of said teeth define a rotational angle equal to said predetermined angular rotation interval, said means for generating period identification signals includes:
means for generating a tooth signal each time one of the ring gear teeth passes a predetermined fixed position;
a first counter for counting said tooth signals and storing a number indicative of the number of tooth signals generated after each reference signal said counter being reset by each of said reference signals; and
decoder means for sequentially generating said period identification signal in response to the number of counts stored in said first counter.

47. The closed loop ignition timing control of claim 46 wherein said means for generating period signals comprises:
an oscillator generating output signals at a rate substantially higher than the frequency of said tooth signals;
a second counter counting and storing said output signals during each period identification signal to generate a number indicative of the time required for the rotable element to rotate through each angular rotational increment wherein said numbers are said period signals.

48. The closed loop ignition timing control of claim 45 wherein said engine includes period reference markers attached to the rotable element spaced at angular increments equal to one fourth of said predetermined angular interval and said means for generating period identification signals include:
means for generating marker signal in response to said period reference markers passing a fixed position;
a third counter for counting and storing a number indicative of the marker signals received after each reference signal;
a second decoder for generating said period identification signals in response to the number stored in said fourth counter.

49. The closed loop ignition timing control of claim 48 wherein said means for generating said period signals comprises:
an oscillator for generating output signals at a rate substantially higher than said marker signals; and
fourth counter means for counting and storing said output signals generated during each period identification signal, wherein the numbers stored in said fourth counter are said period signals.

50. The closed loop ignition timing control of claim 30 wherein said engine has a plurality of combustion chambers, said first sensor means generates a like plurality of reference signals indicative of predetermined angular positions of said rotable element with respect to each of said plurality of combustion chambers.

51. The closed loop ignition timing control of claim 50 wherein first sensor means includes means for generating signals characteristic of at least two other engine operating parameters.

52. The closed loop ignition timing control of claim 51 wherein said engine includes an air intake manifold delivering a metered quantity of air to the engine, said first sensor means further includes a speed sensor generating signals indicative of the engine speed and a pressure sensor generating signals indicative of the air pressure in the engine's air intake manifold.

53. A method for generating ignition signals for the spark plugs of an internal combustion engine having at least one cylinder in response to engine operational parameters, at least one spark plug associated with each engine cylinder to ignite the air/fuel mixture in response to the ignition signals, and a rotating element receiving rotational torque impulses generated by the reciprocation of the piston in response to the combustion of the air/fuel mixture, comprising the steps of:
generating from at least one engine operational parameter an advance angle signal indicative of a rotational angle of the rotating element, measured from a fixed reference, at which a generated ignition signal would cause a desired conversion of the energy produced by the combustion of the air/fuel mixture in said at least one cylinder to crankshaft torque as a function of said at least one engine parameter;
generating from the instantaneous rotational velocity of the engine's crankshaft a first signal indicative of the angle at which the rotating element has a maximum rotational velocity in response to each torque impulse generated by the combustion of said air/fuel mixture;
generating a second signal indicative of a predetermined rotational angle of the rotating element;
comparing said first signal with said second signal and generating a correction signal indicative of the difference between said first signal and said second signal;
summing said correction signal with said advance angle signal to generate a sum angle signal; and
converting said sum signal to an ignition signal, said ignition signal energizing the spark plugs to ignite the air/fuel mixture at a time operative to cause the engine to maximize the conversion of combustion energy to rotational torque.

54. The method of claim 53 wherein the engine has a plurality of cylinders, said step of computing further includes the steps of:

generating reference signal indicative of predetermined rotational positions of the engine's crankshaft with respect to each torque impulses generated by the more than one cylinder; and said step of generating a first signal includes generating said first signal in response to said reference signals for each torque impulse generated by the combustion of the air/fuel mixture in each of said plurality of cylinders.

55. The method of claim 53 wherein said step of generating an advance angle signal includes generating said advance angle signal from at least two operational parameters of the engine.

56. The method of claim 55 wherein said engine includes an air intake manifold supplying a metered quantity of air to the engine, said step of generating said advance angle signal includes generating said advance angle signal in response to a signal indicative of the engine's rotational speed and the air pressure in the air intake manifold.

57. The method of claim 54 wherein said step of generating said first signal includes generating a signal characteristic of the phase angle of each torque impulse wherein said phase angle signal indicative of the angle at which the rotating element has a maximum rotational velocity.

58. The method of claim 57 wherein said step of generating said phase angle signal includes the steps of:

generating period reference signals dividing each torque impulse in four equal rotational angular intervals;

detecting the time duration of each period reference signal to generate period signals indicative of the time required for the rotating element to rotate through each of said four equal rotational intervals;

summing said period signals to generate a sin signal and a cos signal;

dividing said sin and cos signals to generate a quotient signal;

converting said quotient signal to said phase angle signal.

59. The method of claim 58 wherein said four period signals in the sequential order in which they are generated are designated $P_1$, $P_2$, $P_3$, and $P_4$, said step of summing comprises the steps of summing said period signals in accordance with the relationships A sin $\phi \approx 1/N$ $(P_1+P_2-P_3-P_4)$ to generate said sin signal; and summing said period signal in accordance with the equation A cos $\phi \approx 1/N$ $(P_1-P_2-P_3+P_4)$ to generate said cos signal where N is the number of period signals.

60. The method of claim 58 wherein said step of dividing includes the steps of:

comparing the values of said sin and cos signals to generate a numerator signal indicative of the signal having the smaller absolute value;

dividing in response to said numerator signal the smaller of said sin and cos signals by the larger of said signals to generate said quotient signal.

61. The method of claim 58 wherein said step of converting said quotient signal further includes the steps of:

addressing a memory storing arctangent values corresponding to the values of the quotient signal to read out a signal having a value indicative of the arctangent of said quotient signal;

converting the signal indicative of the arctangent of said quotient signal to said phase angle signal having a value $\phi$ in response to said numerator signal according to the equations $\phi =$ arctangent (A sin $\phi$/A cos $\phi$)

when said numerator signal is indicative of said sin signal having an absolute value smaller than said cos signal; and $\phi = \tau/2 -$ arctangent (A cos $\phi$/A sin $\phi$)

when said numerator signal is indicative of said cos signal having an absolute value smaller than said cos signal.

62. The method of claim 53 wherein said step of comparing further includes the steps of:

summing sequentially generated first signals to generate an average phase angle signal;

generating said second signal having a predetermined value indicative of a desired phase angle;

subtracting said average first signal and said second signal to generate a difference signal; and accumulating successively generated difference signals to generate said correction signal.

63. The method of claim 53 wherein said step of converting said sum signal to an ignition signal includes the steps of:

rate multiplying said sum signal to generate a rate signal having a pulse frequency proportional to the value of said sum signal;

counting up and storing the pulses of said rate signal in an up counter during a first interval between sequentially generated reference signals to generate a number indicative of a delay time;

transferring said number to a down counter at the end of said first interval;

counting down the number transferred to the down counter at a predetermined rate during a second interval immediately following said first interval to generate a delay time signal terminating when the down counter reaches zero counts, generating said ignition signal in response to the termination of said time delay signal.

64. A method of generating ignition signals for an internal combustion engine having at least one combustion chamber means for delivering a combustible mixture of air and fuel to said at least one chamber in a ratio which is a function of certain engine operational parameters, mixture ignition means associated with the at least one chamber to ignite the delivered air/fuel mixture, and a movable element receiving torque impulses generated in response to the burning of the air/fuel mixture comprising:

sensing at least one engine operating parameter and generating signals representing a characteristic of said at least one engine operating parameter;

generating signals indicative of the instantaneous velocity of the engine movable element;

generating a correction signal which is a function of the instantaneous signal relative to the reference signal in response to said second sensor means signal; and generating ignition signals in response to said first sensor means signal and said correction signal adapted to energize the ignition means at a time operative to cause said torque impulse resulting from the burning of the air/fuel mixture to impart a peak rotational velocity to the rotable element at a predetermined angle of the rotable member.

65. The method of claim 64 wherein said correction signal generating step comprises:
generating phase angle signals indicative of the phase angle of each torque impulse imparted to the movable element in response to the signals generated by said sensing step; and
generating said correction signal in response to said reference phase angle signal and said phase angle signal.

66. The method of claim 64 wherein said velocity signal generating step further includes:
generating a reference signal at predetermined positions of said movable element.

67. The method of claim 66 wherein said step of generating phase angle signals includes generating said phase angle signals with respect to said reference signal.

68. The method of claim 67 wherein said correction signal generating step further comprises:
generating error signals having a value indicative of the difference between said phase angle signal and reference phase angle signal; and
generating said correction signal having a value indicative of the sum of said error signals.

69. The method of claim 68 wherein said correction step further comprises:
averaging more than one actual phase angle signal and generating average phase angle signals;
generating error signals having a magnitude and polarity indicative of the difference between said average phase angle signals and said reference phase angle signal; and
generating said correction signal having a value and polarity indicative of the sum of said error signals.

70. The method of claim 68 or 69 wherein said phase angle signal generating steps further comprises:
generating function signals indicative of the values $A \sin \phi$ and $A \cos \phi$ in response to said reference signals and the signals indicative of the instantaneous velocity of the movable element where $\phi$ is the phase angle of the torque impulse and A is a constant; and
generating said phase angle signals in response to said function signals.

71. A closed loop fuel distribution control to equalize the torque impulses applied to an output shaft of an internal combustion engine having a plurality of combustion chambers receiving and burning fuel therein in a predetermined sequence, said fuel distribution control comprising:
first sensor means for sensing combustion chamber reference positions at predetermined rotational positions of the output shaft, each of said reference positions being associated with different ones of said combustion chambers and having a predetermined relationship to the sequence in which the fuel is burned in each of said combustion chambers and generating a reference signal for each such reference position;
second sensor means for sensing the rotational velocity of the output shaft and generating signals indicative of the instantaneous rotational velocity thereof;
torque correction signal generator means for generating a plurality of torque correction signals one for each of said combustion chambers in response to said reference signals and said velocity signal;
third sensor means sensing at least one other operational parameter of the engine and generating a parameter signal; and
fuel control means responsive to each of said reference signals and said torque correction signals and said parameter signal for controlling the fuel delivered to each combustion chamber for equalizing the torque impulses applied to the output shaft by each such combustion chamber.

72. The fuel distribution control of claim 71 wherein said torque signal generator means comprises:
first means responsive to said velocity and reference signals associated with each torque impulse for generating a signal $f_1(\phi)$ indicative of the angle at which the output shaft has a maximum rotational velocity with respect to the reference signal associated with the combustion chamber producing the torque impulse;
second means responsive to said velocity and reference signals associated with each torque impulse for generating a signal $f_2(M)$ indicative of the magnitude of each torque impulse;
third means responsive to said velocity and reference signals associated with each torque impulse for generating a signal $f_3(RPM)$ indicative of the average rotational speed of the output shaft;
means for combining said $f_1(\phi)$, $f_2(M)$, and $f_3(RPM)$ signals to generate a torque signal T indicative of the torque produced by each combustion chamber;
means for averaging the torque signals T to generate an average torque signal $T_{avg}$;
means for subtracting the signal $T_{avg}$ from each torque signal T to generate a correction signal for each combustion chamber; and
means having a like plurality of storage means, one storage means associated with each of said combustion chambers, for accumulating in the storage means said correction signals to generate a torque correction signal for each combustion chamber.

73. The fuel distribution control of claim 72 wherein said first means is a phase angle generator generating a phase angle signal indicative of the phase angle of each torque impulse with respect to said reference signals wherein said phase angle is said signal $f_1(\phi)$.

74. The fuel distribution control of claim 73 wherein said phase angle generator comprises:
means for generating function signals $A \sin \phi$ and $A \cos \phi$ having values indicative of the sin and cos Fourier coefficients of each torque impulse in response to said velocity and reference signals where $\phi$ is the phase angle of the torque impulse with respect to said reference signal associated with the combustion chamber generating the torque impulse and A is a constant; and
converter means responsive to said function signals for converting said function signals to said signal $f_1(\phi)$.

75. The fuel distribution control of claim 74 wherein said first sensor means comprises:
means responsive to the rotational position of the output shaft for generating period reference signals dividing each torque impulse into four equal angular increments; and
means responsive to said period reference signals for generating four period signals indicative of the time required for the output shaft to rotate through each of said four equal angular increments, the four period signals being identified as $P_1$, $P_2$, $P_3$, and $P_4$ in the sequential order in which they are generated.

76. The fuel distribution control of claim 75 wherein said means for generating said function signal is means for summing and accumulating said four period signals in accordance with the relationships:

$$A \sin \phi \approx [P_1 + P_2 - P_3 - P_4]$$
and
$$A \cos \phi \approx [P_1 - P_2 - P_3 + P_4].$$

77. The fuel distribution control of claim 74 wherein said converter means comprises:
  means for dividing said function signals $A \sin \phi$ and $A \cos \phi$ to generate a quotient signal; and
  means for generating from said quotient signal said signal $f_1(\phi)$ having a value indicative of arctangent ($A \sin \phi / A \cos \phi$).

78. The fuel distribution control of claim 77 wherein said means for dividing comprises:
  comparator means for generating a numerator signal indicative of the function signal having the smaller value; and
  divider means responsive to said numerator signal for dividing the smaller function signal by the larger function signal to generate said quotient signal.

79. The fuel distribution control of claim 78 wherein said means for generating from said quotient signal the signal $f_1(\phi)$ comprises:
  a read only memory addressed by said quotient signal to output an arctangent signal having a value indicative of the arctangent of the quotient signal;
  arctangent conversion means for converting said arctangent signal to said signal $f_1(\phi)$ in response to said numerator signal where $f_1(\phi)$ has a value indicative of the angle $\phi$ where
  $\phi \approx$ arctangent ($A \sin \phi / A \cos \phi$)
when the numerator signal is indicative of $A \sin \phi$ being the smaller of the two function signals; and
  $\phi \approx \pi/2$-arctangent ($A \cos \phi / A \sin \phi$)
when the numerator signal is indicative of $A \cos \phi$ being the smaller of said two function signals.

80. The fuel distribution control of claim 74 wherein said second means comprises:
  means for generating absolute value signals $|A|$ and $|B|$ where $|A|$ and $|B|$ are indicative of the absolute values of the function signals $A \sin \phi$ and $A \cos \phi$ respectively;
  means for summing $|A|$ and $|B|$ to produce a sum signal having a value $|A| + |B|$;
  means for multiplying said sum signal times a constant K to generate a mean signal having a value K ($|A| + |B|$); and
  means for comparing the absolute value signals $|A|$ and $|B|$ with the mean signal and outputting the largest of said three signals wherein the signal having the largest value is said signal $f_2(M)$.

81. The fuel distribution control of claim 80 wherein said means for multiplying, multiplies said sum signal by a constant K having a value 0.6875.

82. The fuel distribution control of claim 72 wherein said means for combining is a multiplier means multiplying together said signals $f_1(\phi)$, $f_2(M)$ and $f_3(RPM)$ to generate a torque signal T having a value
  $T = f_1(\phi), f_2(M), f_3(RPM) \cdot K$
where K is a constant determinable from the operating parameters of the engine.

83. The fuel distribution control of claim 72 wherein said means for accumulating said correction signals comprises:
  means detecting a predetermined rotational position of the output shaft for generating a reference signal identifying one particular combustion chamber;
  means for counting and storing a number of combustion chamber reference signals received after said reference signal identifying one particular combustion chamber;
  means responsive to the number stored in said counter means for sequentially generating a plurality of gate signals equal in number to the number of combustion chambers;
  a plurality of storage means, one for each combustion chamber; and
  a plurality of adder gates, one associated with each storage means, each of said adder gates enabled one at a time by said gate signals to add said correction signal received during its enabled state to the content of its associated storage means.

84. The fuel distribution control of claim 83 wherein said means for accumulating further includes comparator means for comparing each said correction signal with a threshold value, said comparator transmitting to said plurality of adder gates only said correction signals having a value greater than the threshold value.

85. The fuel distribution control of claim 83 additionally including means for sequentially outputting said torque correction signals to said fuel control means in response to said reference signals in a sequence having a fixed time relationship to the fuel delivered to each combustion chamber.

86. The fuel distribution control of claim 85 wherein said means for sequentially outputting said torque correction signals comprises:
  a plurality of input gate means, one associated with each storage means, each of said input gate means enabled one at a time by said gate signals to transmit the torque correction signal stored in the associated storage means to said fuel control means.

87. A method for equalizing the torque impulse from each combustion chamber of an internal combustion engine having an output shaft receiving torque impulses in response to the burning of fuel in each combustion chamber, the method comprising the steps of:
  sensing a plurality of rotational positions of the engine's output shaft to generate reference signals wherein at least one reference signal is associated with each combustion chamber and its torque impulse;
  sensing the rotation of the output shaft to generate velocity signals indicative of the instantaneous rotational velocity of the output shaft;
  combining said reference and velocity signals to generate for each combustion chamber a torque correction signal;
  sensing at least one other operational parameter of the engine to generate parameter signal; and then
  combining said parameter, reference and torque correction signal to generate a fuel delivery signal for each combustion chamber for delivering fuel to each combustion chamber to equalize the torque impulse from each combustion chamber.

88. The method of claim 87 wherein said step of combining said reference and velocity signals to generate said torque correction signals comprises the steps of:
  combining said reference and velocity signals associated with each torque impulse to generate a signal $f_1(\phi)$ having a value indicative of the angle at which the output shaft has a maximum rotational velocity with respect to the reference signal associated with the combustion chamber producing the torque impulse;

combining the reference and velocity signals associated with each torque impulse to generate a signal $f_2(M)$ having a value indicative of the magnitude of each torque impulse;

combining the reference and velocity signals to generate a signal $f_3$ (RPM) indicative of the average rotational velocity of the output shaft;

multiplying together said $f_1(\phi)$, $f_2(M)$ and $f_3$ (RPM) signals to generate a torque signal T indicative of the magnitude of the torque generated by each combustion chamber;

averaging the torque signals T generated by at least two of the combustion chambers to generate a signal $T_{avg}$ indicative of the average torque;

subtracting the signal $T_{avg}$ from the individual torque signals T to generate correction signals indicative of the difference between the torque generated by the individual combustion chambers and the average torque; and then storing each said correction signal separately in response to said reference signal to generate a torque correction signal for each combustion chamber.

89. The method of claim 88 wherein said combining step to generate said $f_1(\phi)$ signal combines said reference and velocity signals to generate a phase angle signal having a value indicative of the phase angle of each torque impulse with respect to its respective reference signal; wherein said phase angle signal is indicative of said signal $f_1(\phi)$.

90. The method of claim 89 wherein said step of combining to generate a phase angle signal comprises the steps of:

combining said reference and velocity signals to generate function signal A sin $\phi$ and A cos $\phi$ having values indicative of the sin and cos Fourier coefficients of each torque impulse where $\phi$ is the phase angle of the torque impulse and A is a constant;

dividing said function signals, one by the other generate a quotient signal; and converting said quotient signal to a phase angle signal $\phi$ having a value
$\phi$ = arctangent (A sin $\phi$/A cos $\phi$).

91. The method of claim 90 wherein said step of dividing includes the steps of:

comparing said function signals to generate a numerator signal indicative of the smaller function signal; and dividing the smaller function signal by the larger function signal in response to said numerator signal to generate said quotient signal.

92. The method of claim 91 wherein said step of converting includes the steps of:

addressing a read only memory with said quotient signal to output an arctangent signal having a value indicative of the arctangent of the quotient signal;

converting said arctangent signal to said signal $f_1(\phi)$ in response to said numerator signal wherein said signal $f_1(\phi)$ is equal to $f_1(\phi) \approx \pi/2$ arctangent (A cos $\phi$/A sin $\phi$)

when the numerator signal is indicative of the function signal A cos $\phi$ being the smaller of the two function signals.

93. The method of claim 90 wherein said step of sensing the rotation of the rotating member to generate velocity signals comprises the steps of:

generating four period reference signals indicative of four equal angular increments for each torque impulse applied to the rotating member;

measuring the time required for the rotating member to rotate through each of said four equal angular increments to sequentially generate four period signals identified as $P_1$, $P_2$, $P_3$, and $P_4$ in the order in which they are generated;

summing said four period signals in accordance with the relationships;

A sin $\phi \approx 1/N$ [$P_1 + P_2 - P_3 - P_4$]

to generate said function signal A sin $\phi$; and summing said four period signal in accordance with the relationships;

A cos $\phi \approx 1/N$ [$P_1 - P_2 - P_3 + P_4$]

to generate said function signal A cos $\phi$ when N is the number of period signals.

94. The method of claim 88 wherein said step of combining to generate said signal $f_2(M)$ includes the steps of:

converting said function signals to generate absolute value signals A and B indicative of the absolute values of the function signal A sin $\phi$ and A cos $\phi$ respectively;

adding said absolute value signals together and multiplying by a constant to generate a mean signal;

comparing said absolute value signals A and B to said mean signal to determine the signal having the largest value, wherein the signal having the largest value is said signal $f_2(M)$.

95. The method of claim 94 wherein said step of multiplying the sum of said absolute value signals by a constant, multiplies said sum by a constant having a value 0.6875.

96. The method of claim 88 wherein said step of sensing a plurality of rotational positions includes the step of sensing a reference signal identifying one particular combustion chamber.

97. The method of claim 96 wherein said step of storing comprises the steps of:

counting and storing a number indicative of the number of combustion chamber reference signals received after each said at least one combustion chamber reference signal identifying one particular combustion chamber signal;

decoding each stored number to sequentially generate a plurality of gate signals equal in number to the number of combustion chambers; and enabling said storage means sequentially in response to said gate signals to accumulate and store the torque correction signals in separate storage means for each combustion chamber.

98. A signal generator for generating a signal indicative of the value of an applied force imparting a torque impulse to a rotary member comprising:

first sensor means detecting at least one predetermined rotational position of the rotary member for generating reference signals;

second means detecting the rotation of the rotary member for generating rotational velocity signals indicative of the rotary members instantaneous rotational velocity;

first means responsive to said rotational velocity and reference signals associated with each torque impulse for generating for each torque impulse a signal $f_1(\phi)$ indicative of the rotational angle at which the rotary member has a maximum rotational velocity with respect to said reference signals;

second means responsive to said velocity and reference signals associated with each torque impulse for generating a signal f₂(M) indicative of the magnitude of each torque impulse;

third means responsive to said velocity and reference signals associated with each torque impulse for generating a signal f₃(RPM) indicative of the average rotational speed of the rotary member; and means for combining said $f_1(\phi)$, $f_2(M)$, and $f_3(RPM)$ signals to generate a torque signal indicative of the applied force.

99. The signal generator of claim 98 wherein said first means is a phase generator generating a phase angle signal indicative of the phase angle of each torque impulse with respect to said reference signals wherein said phase angle signal is said signal $f_1(\phi)$.

100. The signal generator of claim 99 wherein said phase angle generator comprises:

means for generating function signals A sin $\phi$ and A cos $\phi$ having values indicative of the sin and cos Fourier coefficients of each torque impulse in response to said velocity and reference signals where $\phi$ is the phase angle of the torque impulse with respect to the reference signals and A is a constant; and converter means for generating said signal $f_1(\phi)$ from said function signals.

101. The signal generator of claim 100 wherein said second sensor means comprises:

means responsive to the rotational position of said rotary member for generating period reference signals dividing each torque impulse into four equal angular increments;

means responsive to said period reference signals for generating four period signals indicative of the time required for the rotary member to rotate through each of said four equal angular increments, the four period signals being identified as $P_1$, $P_2$, $P_3$, and $P_4$ in the sequential order in which they are generated; and wherein said means for generating said function signal is means for summing and accumulating said four period signals in accordance with the relationships:

A sin $\phi \approx [P_1+P_2-P_3-P_4]$
A cos $\phi \approx [P_1-P_2-P_3+P_4]$

102. The signal generator of claim 100 wherein said converter means comprises:

means for dividing said function signals A sin $\phi$ and A cos $\phi$ to generate a quotient signal; and means for generating from said quotient signal said signal $f_1(\phi)$ having a value indicative of arctangent (A sin $\phi$/A cos $\phi$).

103. The signal generator of claim 102 wherein said means for dividing further includes:

$\phi$ comparator means for generating a numerator signal indicative of the function signal having the smaller value; and divider means responsive to said numerator signal for dividing the smaller function signal by the larger function signal to generate said quotient signal.

104. The signal generator of claim 103 wherein said means for generating the signal $f_1(\phi)$ from said quotient signal comprises:

a read only memory addressed by said quotient signal to output an arctangent signal having a value indicative of the arctangent of the quotient signal;

arctangent conversion means for converting said arctangent signal to said signal $f_1(\phi)$ in response to said numerator signal where $f_1(\phi)$ has a value indicative of the phase angle $\phi$ where $\phi$=arctangent (A sin $\phi$/A cos $\phi$)

when the numerator signal is indicative of A sin $\phi$ being the smaller of the two function signals; and $\phi = \pi/2$-arctangent (A cos $\phi$/A sin $\phi$)

when the numerator signal is indicative of A cos $\phi$ being the smaller of said two function signals.

105. The signal generator of claim 100 wherein said second means comprises:

means for generating absolute value signals |A| and |B| where |A| and |B| are indicative of the absolute values of the function signals A sin $\phi$ and A cos $\phi$ respectively;

means for adding the signals |A| and |B| to generate a sum signal;

means for multiplying said sum signal by a constant k to generate a mean signal having a value k(A+B); and means for comparing the absolute value signals |A| and |B| with the mean signal and outputting the largest of said three signals wherein the signal having the largest value is said signal $f_2(M)$.

106. The signal generator of claim 105 wherein said means for multiplying multiplies said sum signal by a constant having a value 0.6875.

107. The signal generator of claim 98 wherein said means for combining is a multiplier means multiplying together said signals $f_1(\phi)$, $f_2(M)$ and $f_3(RPM)$ to generate said torque signal having a value $T=f_1(\phi)$, $f_2(M),f_3(RPM)$, K where K is a torque to force conversion determinable from the physical operating parameters of the rotary member.

108. The signal generator of claim 107 wherein the multiplier means multiplies the signals $f_1(\phi)$, $f_2(M)$ and $f_3(RPM)$ by a constant K having a value proportional to L sin $\theta$ where L is the distance from rotary members axis of rotation to the point at which the force is applied and sin $\theta$ is a constant indicative of the angle between lever arm to the direction of the applied force.

109. A phase angle generator for generating a signal indicative of the phase angle of torque impulses imparted to a rotary member comprising:

first sensor means for sensing the rotation of the rotary member and generating reference signals indicative of at least one predetermined angular position of the rotary member with respect to the torque impulse;

second sensor means detecting the rotation of the rotary member for generating velocity signals indicative of the instantaneous rotational velocity of the rotary member;

means responsive to said first and second sensor means for generating function signals A sin $\phi$ and A cos $\phi$ having values indicative of the sin and cos Fourier coefficients of each torque impulse where $\phi$ is the phase angle of the torque impulse measured from said reference signals and A is a constant indicative of the amplitude of the torque impulse;

means for dividing said function signals, one by the other, to generate said phase signal having a value $\phi$=arctangent (A sin $\phi$/A cos $\phi$).

110. The phase angle generator of claim 109 wherein said means for dividing comprises:

$\phi$ comparator means for comparing the value A sin $\phi$ with the value of A cos $\phi$ to generate a numberator signal indicative of the function signal having the smaller value;

divider means for dividing the function signal having the smaller value by the function signal having the larger value to generate a quotient signal;

means for converting said quotient signal to an arctangent signal having a value indicative of the arctangent of said quotient signal; and means for converting said arctangent signal to said phase angle in response to said numerator signal where said phase signal equals arctangent (A sin $\phi$/A cos $\phi$) when said numerator signal is indicative of the value of A sin $\phi$ being smaller than the value of A cos $\phi$ and said phase=$\pi$/2-arctangent (A cos $\phi$/A sin $\phi$) when the numerator signal is indicative of the value of A cos $\phi$ cos being smaller than the value of A sin $\phi$.

111. The phase angle generator of claim 109 wherein each torque impulse is measured over a predetermined rotational interval of the rotary member, said second sensor means comprises:

means for generating period identification signals, each period identification signal indicative of a angular rotational increment of the rotary member equal to one fourth of said predetermined angular rotational intervals;

means responsive to said period identification signals for generating period signals $P_1$, $P_2$, $P_3$, and $P_4$ indicative of the time required for the rotary member to sequentially rotate through each of said angular rotatational increments; and wherein said means for generating function signals is a means for summing said period signals in accordance with the relationships:

A sin $\phi \approx 1/N[(P_1-P_3)+(P_2-P_4)]$
and
A cos $\phi \approx 1/N[(P_1-P_3)-(P_2-P_4)]$
where N is the number of period signals.

112. The phase angle generator of claim 109 wherein said means for summing comprises:

first storage means for storing said function signal having a value A sin $\phi$;

second storage means for storing said function signal having a value A cos $\phi$;

first gate means responsive to period identification signals for gating said period signals to said first storage means in accordance with the relationships:

A sin $\phi \approx P_1+P_2-P_3-P_4$
and second gate means responsive to said period identification signals for gating said period signal to said second storage means in accordance with the relationships:

A cos $\phi \approx P_1-P_2-P_3+P_4$.

113. The phase angle generator of claim 111 wherein said means for generating period identification signals comprise:

first angle encoder means attached to said rotary member for generating a predetermined number of angle increment signals during each of said predetermined rotational intervals of the rotary member;

first counter means, reset in response to each reference signal for storing a number indicative of said angle increment signals generated after each reference signal;

decoder means responsive to predetermined numbers stored in said first counter means for generating said period identification signals, each of said predetermined numbers indicative of a rotational angular increment equal to one fourth of said predetermined angular interval.

114. The phase angle generator of claim 113 wherein the rotary member is the output shaft of an internal combustion engine and wherein a ring gear having a plurality of teeth about its circumference at equal angular intervals is coupled to the engine's output shaft, said first angle encoder means is a tooth detector generating said angle increment signals each time a tooth on said ring gear passes said tooth detector.

115. The phase angle generator of claim 111 wherein said means for generating period identification signals comprise:

second angle encoder means attached to said rotary member for generating four increment angle signals indicative of four equal rotational angular increments within each of said predetermined angular intervals;

second counter means reset in response to said reference signals for storing the number of increment angle signals generated after each of said reference signals; and decoder means responsive to the number stored in said counter means for generating said period identification signals.

116. The phase angle generator of claims 113 or 115 wherein said means for generating said period signals comprise;

an oscillator generating oscillator signals at a rate substantially higher than rate at which said period identification signals are generated; and third counter means reset by each of said period identification signals for storing a number of oscillator signals generated between said period identification signals.

* * * * *